Patented Aug. 19, 1924.

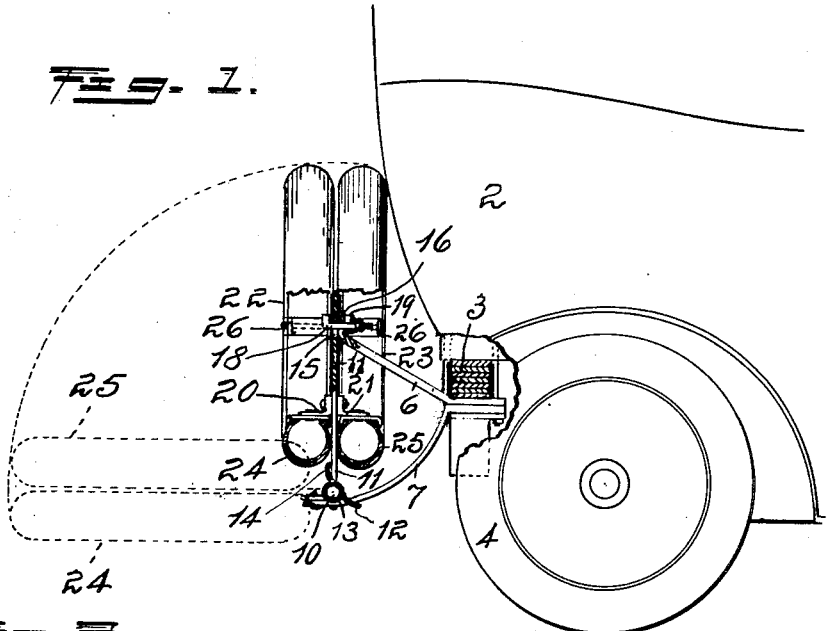
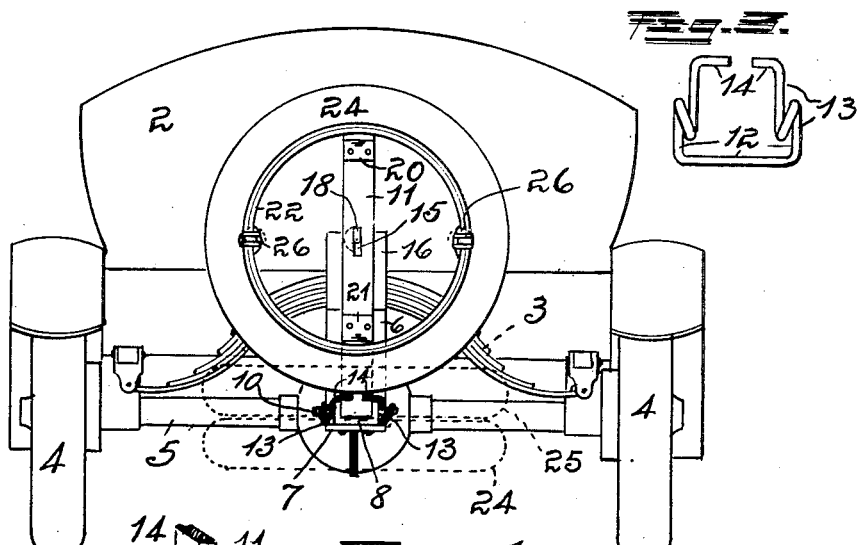

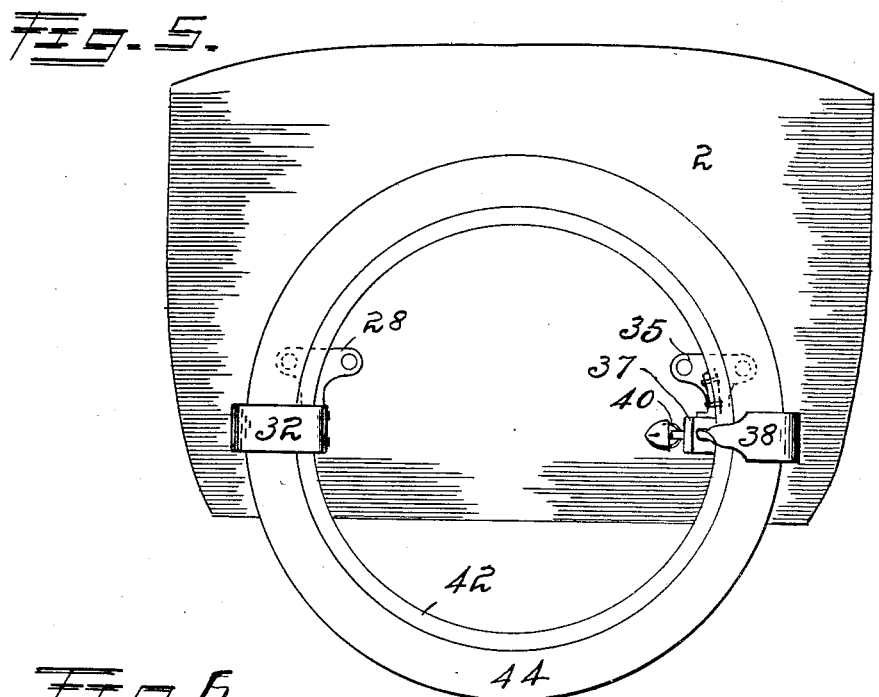
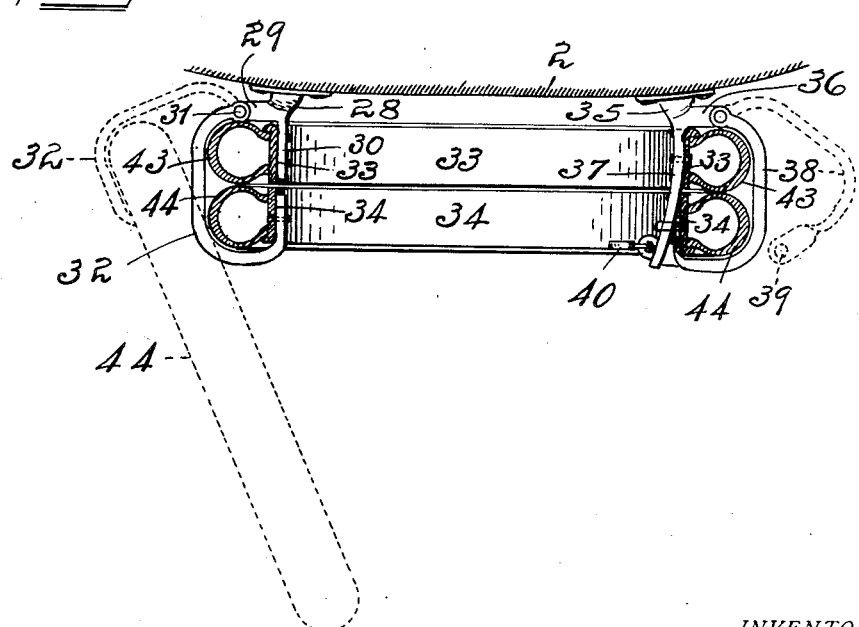

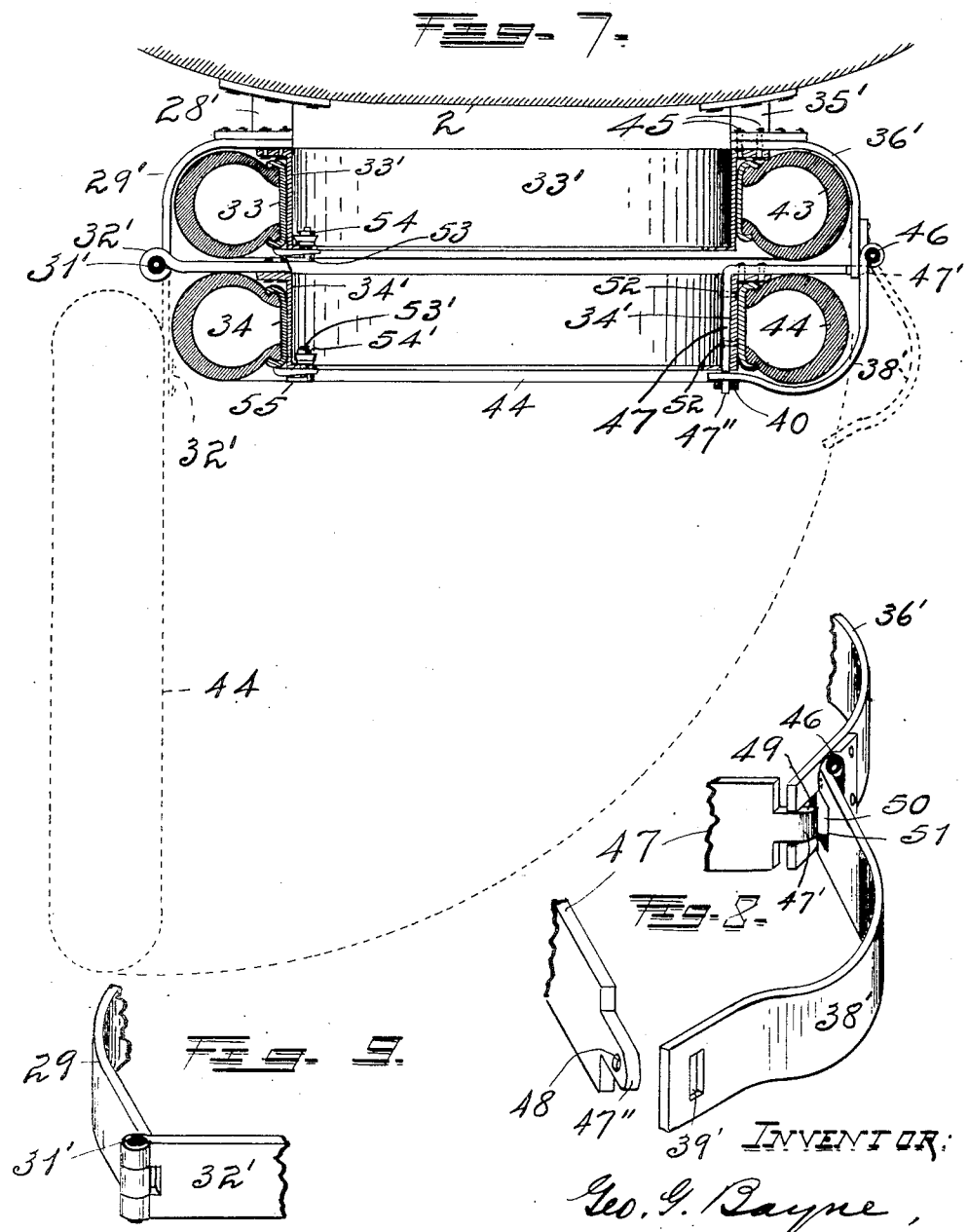

1,505,927

UNITED STATES PATENT OFFICE.

GEORGE G. BAYNE, OF BUSHNELL, ILLINOIS.

TIRE AND WHEEL CARRIER FOR AUTOMOBILES.

Application filed December 18, 1917. Serial No. 207,661.

*To all whom it may concern:*

Be it known that I, GEORGE G. BAYNE, a citizen of the United States, and resident of Bushnell, in the county of McDonough and State of Illinois, have invented a new and useful Tire and Wheel Carrier for Automobiles, of which the following is a specification.

My invention relates to devices secured to self-propelled vehicles and adapted to carry extra wheels or casings.

The principal object of the invention is to provide a novel device whereby two or more casings, or two or more wheels, or a wheel and a casing, may be carried and to either of which access may be had, for removal or replacement, without disturbing another.

Another object is to provide a plural-part hinged-carrier.

A still further object is to include in the carrier a spring whereby to prevent shock in swinging the device to tire-removing position, the spring aiding the return movement.

Several minor objects will presently appear, some of which will be obvious and others particularly pointed out.

In the accompanying drawings:

Figure 1 is a side elevation showing a preferred embodiment of my improvements and the application thereof;

Fig. 2, a rear elevation of the same;

Fig. 3, a detail of the spring;

Fig. 4, a perspective detail of the hinge;

Fig. 5, a rear elevation of a modified form of carrier;

Fig. 6, a transverse section thereof;

Fig. 7, another modification, shown partly in vertical section and partly in elevation;

Fig. 8, a perspective detail of the locking devices shown in Fig. 7, broken away; and Fig. 9, a perspective detail of the hinge shown at the left hand edge of Fig. 7.

Coming now to a detailed description of the drawings, 2 indicates a portion of the body of an automobile, of which 3 designates the rear spring; 4, 4 the rear wheels; and 5 the axle-housing.

Considering Figs. 1 to 4 inclusive, 6 denotes an upper and 7 a lower supporting-arm, both secured to the rear part of the vehicle and preferably to and underneath the midlength of the spring 3. To the free end of the arm 7 is fixed a hinge-bracket 8 having apertured ears 9 through which passes a pintle 10 on which is fulcrumed a carrier-arm 11. The elements 8, 9, 10 and 11 constitute a hinge. The loop 12 of a double coil-spring 13 embraces the rear end portion of the supporting-arm 7, its inturned terminals 14 are lapped over the rear face of the carrier-arm 11, and its coils encircle the ends of the pintle 10. The arm 11 is provided with a slot 15 and the upturned end 16 of the arm 6 with an aperture registering therewith. A quick-release bolt 18 is passed through this slot and aperture and is engaged by a nut 19. A part-rotation of said bolt permits its offset head to pass through the slot 15, for a purpose presently described.

20, 21 indicate pairs of rim-supporting brackets secured to the upper and lower portions of the arm 11. Tire-rims 22, 23 respectively are carried thereon. 24, 25 indicate tires. 26, indicate brackets secured to the rims 22 and 23.

To release the tire 24, it is necessary only to free it from the brackets 26. To release the tire 25, either before or after releasing the tire 24, or even without disturbing it, it is necessary only to rotate the bolt 18 sufficiently to bring its offset head into registration with the slot 15 and then lower the bar 11 and everything carried thereby to the dotted line position shown best in Fig. 1, the slot 15 passing over said bolt head, and to then free the tire from its restraining bracket 26. The spring will during this movement be compressed, and it will thus prevent the arm 15 etc. falling sharply and injuring any of the parts. It will be observed also that the energy thus stored in the spring will automatically be yielded to assist the operator in raising the arm 11 and tires or wheels to the normal position shown by full lines in Figs. 1 and 2. When these have been raised as just described the operator will impart sufficient rotary movement to the bolt 18 to cause its head to bind frictionally against the rear face of the arm 11 and thus lock the latter in normal position.

Considering the modified structure shown best in Figs. 5 and 6, a bracket 28 is secured to the body 2 or to any other suitable part of the vehicle, and has arms 29 and 30. To the arm 29 is hinged at 31 a loop 32. Rings 33 and 34 are secured respectively to the arm 30 and to the forwardly projecting end of the loop 32.

35 indicates a bracket-arm secured to the body 2 or elsewhere as desired, opposite the arm 28. It includes an arm 36 and a tongue 37. Hinged to the arm 36 is a locking-loop 38 having in its free end an aperture 39. Said end is twisted a quarter-turn and passes through a slot in the outer end of the arm 37. After such placement the bow of a padlock 40 is inserted through the aperture 39 for a purpose presently described. 43, 44 indicate tires or casings carried on said rings.

Assume the parts to be in the full line positions shown in Fig. 6. To free the tire the operator will remove the lock 40 and then swing the arm 38 sidewise as indicated by the dotted lines in Fig. 6. The arm 32 is thus freed to swing to the dotted line position shown in said figure, and as the ring 34 is secured thereto the latter and the casing 44 will be swung into such position that the casing may be readily removed. The action of swinging the arm 32 sidewise leaves the ring 33 and casing 43 unobstructed and the latter may be removed in an evident manner, whether or not the casing 44 has been removed.

Considering Figs. 7 to 9 inclusive, 33' and 34' indicate rings substantially Z-shaped in cross-section, the former being secured to brackets 28' and 35' carried by the car. 29' indicates an arm secured to the elements 28' and 33', and 32' denotes a locking-bar hinged at 31' to the outer terminal of the arm 29'.

Secured by any suitable means, such as rivets 45, to the bracket 35' is a curved arm 36', said rivets engaging also the ring 33' and thereby securing it to said bracket and arm. Hinged at 46 to said arm is a locking-loop 38' having near its free end an opening 39' through which passes the constricted rear end 47'' of a substantially L-shaped bracket 47, said end being provided with an aperture 48 for the reception of the bow of the lock 40. The outer end 47' of the bracket 47 also is constricted and passes through normally registering notches 49, 50 in the adjacent ends of the elements 36' and 38' respectively, whereby, when the devices are in operative positions said outer end is locked behind the shoulder 51 at the rear end of the notch 50. The rearwardly extending branch of the arm 47 is secured, as by rivets 52, to the ring 34'.

Any suitable means, such as quick-release clamps 53, 53' and nuts 54, 54' may be employed for binding the rings 33, 34, at one side of the carrier, in place. In these the stems of the bolts pass through openings in the rear flanges of the rings 33', 34' and are locked each by its nut 54 or 54'. The particular construction of these elements is immaterial; in fact those shown are fully disclosed in United States Letters Patent No. 1,106,890 issued Aug. 11, 1914.

To release the rear tire from structure disclosed best in Fig. 7 the offset head 55 of the bolt 53' is to be given a part-rotation in order to move it from its position in rear of the edge of the tire-holding ring 34, thus releasing one (the left hand) side of the tire 44 and said ring. Thereupon the securing element 40 is removed from the eye 48 to permit the loop 38' to be swung to the position shown by dotted lines, thus releasing the other edge of said tire and ring. These may then be manually removed in an evident manner.

To release the forward tire and its ring—the loop 38' still being in its dotted line position—all that is required is to swing the locking-bar 32' to the dotted line position shown in Fig. 7 and to then partly rotate the offset head of the bolt 53, for the above described release movement of the loop 38' freed the shoulder 51 from the tongue or bracket-end 47' and left it in position to pass out of the notch 49. If it be desired to remove the ring 33 and tire 43 without first removing the tire 44 this may be accomplished by first removing the lock 40, then swinging the loop 38' to its dotted line position, then swing the bar 32' to its dotted line position, then releasing the bolt 54, and finally drawing the tire and ring from off the ring 33'.

While I have in the accompanying drawings shown, and have in this specification described two somewhat contrasted hinge-means for carrying wheels or tires, it will be evident that both are within the limits of the invention, the object being to instruct persons skilled in the art to understand the nature of and to carry out the inventive idea in more than one particular manner; and I desire it to be expressly understood that description by me of these two forms is in no manner intended to exclude others not referred to but which fall within the scope of the invention as defined in the appended claims.

I claim as new the following, to wit:

1. In a device of the class described, the combination with a support having an upper arm and a lower arm, a tire carrier hinged to said lower arm and provided with a slot opposite the other arm, a bolt extending through said slot and connecting said tire carrier to the upper arm, said bolt having a head so formed as to pass through said slot when properly turned.

2. In a device of the class described, the combination with a support having an upper arm and a lower arm, a hinge member pivoted to the lower arm and provided with a slot adjacent the other arm, a tire carrier secured to said hinge member, and a rotatable connecting member extending through said slot for releasably anchoring the hinge member to the upper arm.

GEORGE G. BAYNE.